(12) United States Patent
Pohlman

(10) Patent No.: US 8,316,504 B1
(45) Date of Patent: Nov. 27, 2012

(54) WINDSHIELD ROLLER

(76) Inventor: Jeff Pohlman, Lewisville, TX (US)

( * ) Notice: Subject to any disclaimer, the term of this patent is extended or adjusted under 35 U.S.C. 154(b) by 0 days.

(21) Appl. No.: 12/798,636

(22) Filed: Apr. 8, 2010

Related U.S. Application Data

(60) Provisional application No. 61/202,804, filed on Apr. 8, 2009.

(51) Int. Cl.
*B60S 1/38* (2006.01)
*B60S 1/44* (2006.01)

(52) U.S. Cl. .............. 15/250.22; 15/250.23; 15/250.48; 15/250.361

(58) Field of Classification Search ............. 15/250.22, 15/250.361, 250.48, 250.29, 250.001, 250.23
See application file for complete search history.

(56) References Cited

U.S. PATENT DOCUMENTS

| | | | | |
|---|---|---|---|---|
| 1,739,896 A * | 12/1929 | Garbell | ........ | 15/250.22 |
| 2,392,230 A * | 1/1946 | Collins | ........ | 15/250.17 |
| 2,593,073 A * | 4/1952 | Trevaskis | ........ | 15/250.351 |
| 2,712,148 A * | 7/1955 | Cheshire | ........ | 15/250.22 |
| 3,139,644 A * | 7/1964 | Smith | ........ | 15/250.3 |
| 3,892,006 A * | 7/1975 | Yasumoto | ........ | 15/250.22 |
| 5,255,407 A * | 10/1993 | Yang | ........ | 15/250.22 |
| 7,111,355 B1 * | 9/2006 | Sorensen | ........ | 15/250.04 |

* cited by examiner

*Primary Examiner* — Gary Graham
(74) *Attorney, Agent, or Firm* — Jeffrey Roddy

(57) ABSTRACT

A windshield roller assembly that may be retrofitted to existing wiper arms and that provides a rolling surface so that it is able to conform to surface irregularities and expel dirt and debris from low spots. The rolling surface avoids scraping the windshield glass and is not subject to the shear forces incurred by scraper type blades. The windshield roller is generally a simple cylindrical shape about a flexible shaft such as carbon fiber rod. The geometry of the roller is most typically an elongated frusto-conical shape so as to trace an arced path.

4 Claims, 6 Drawing Sheets

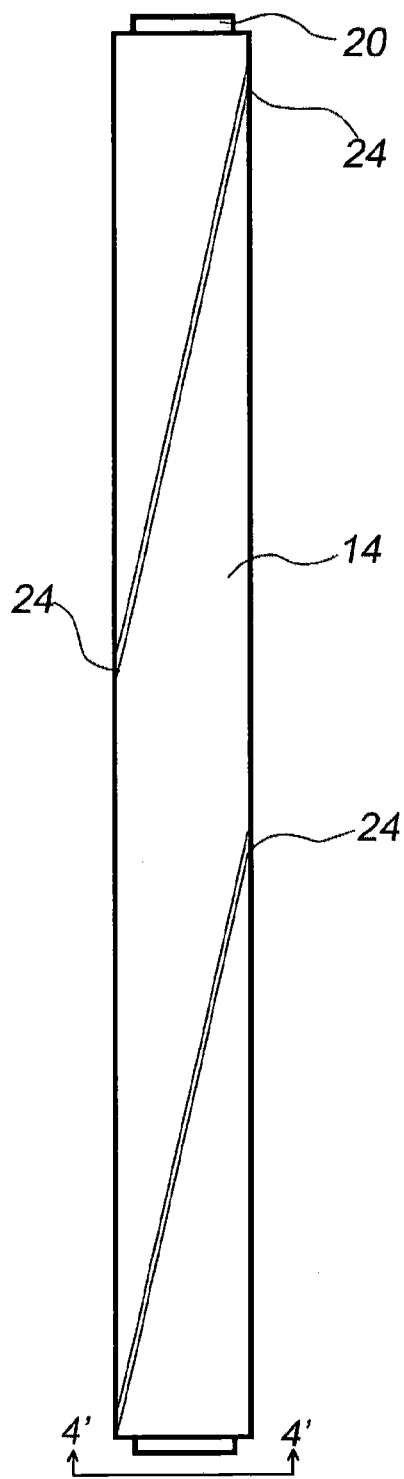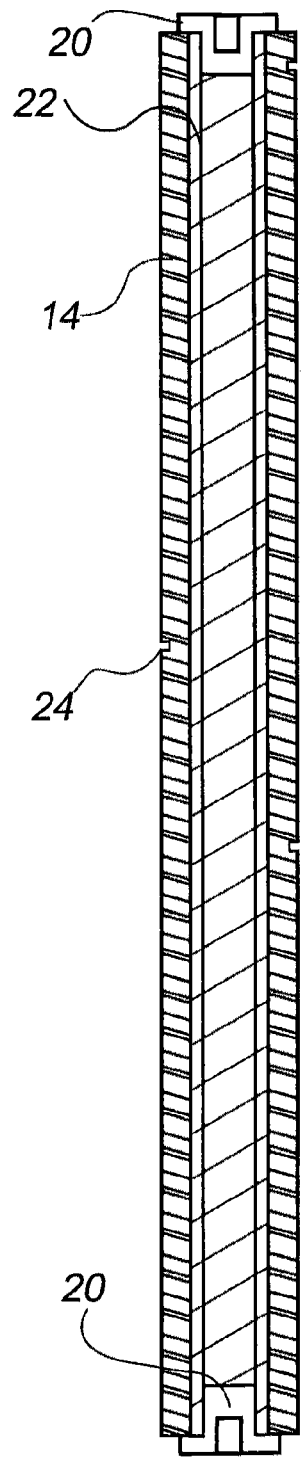

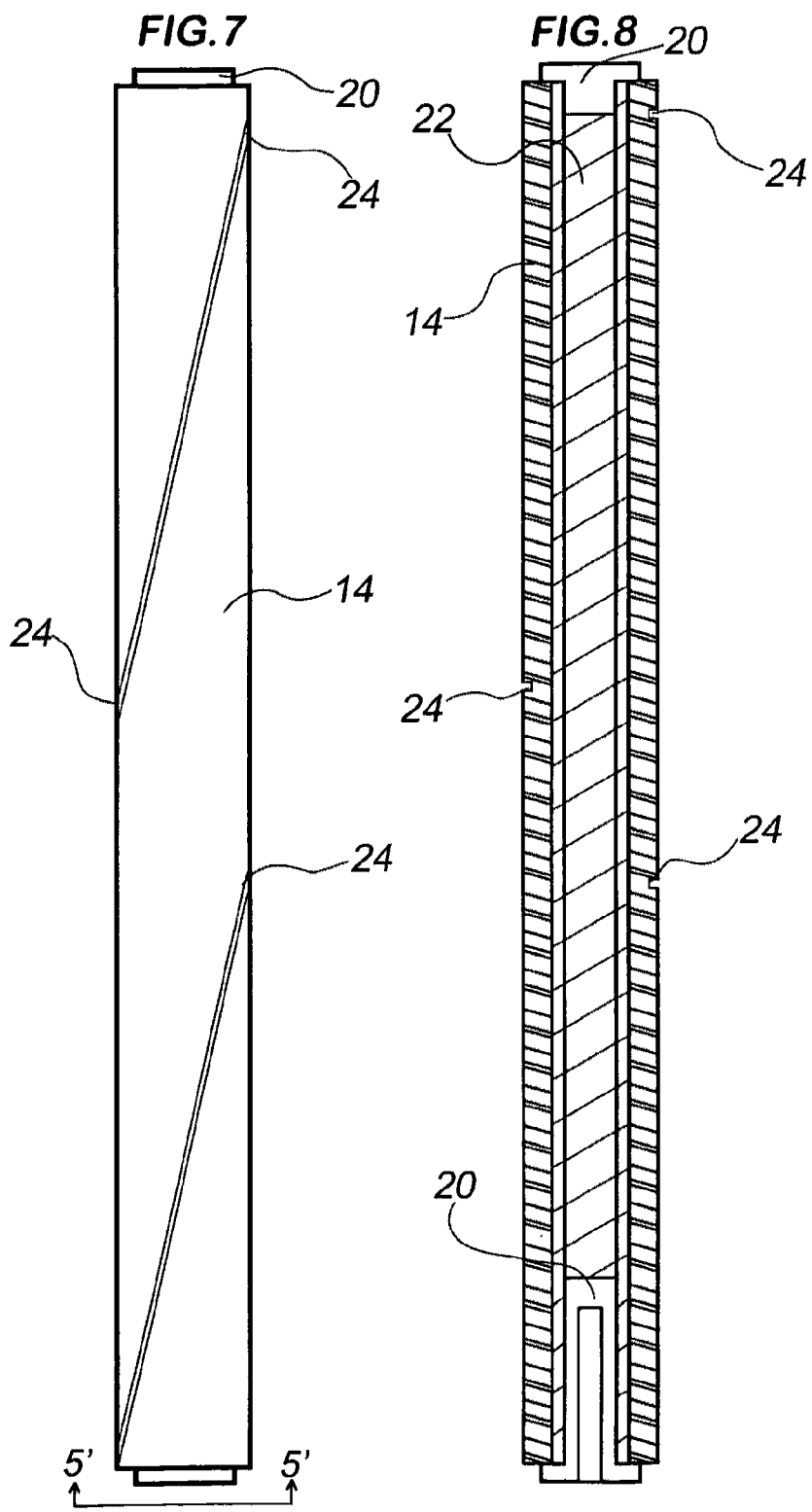

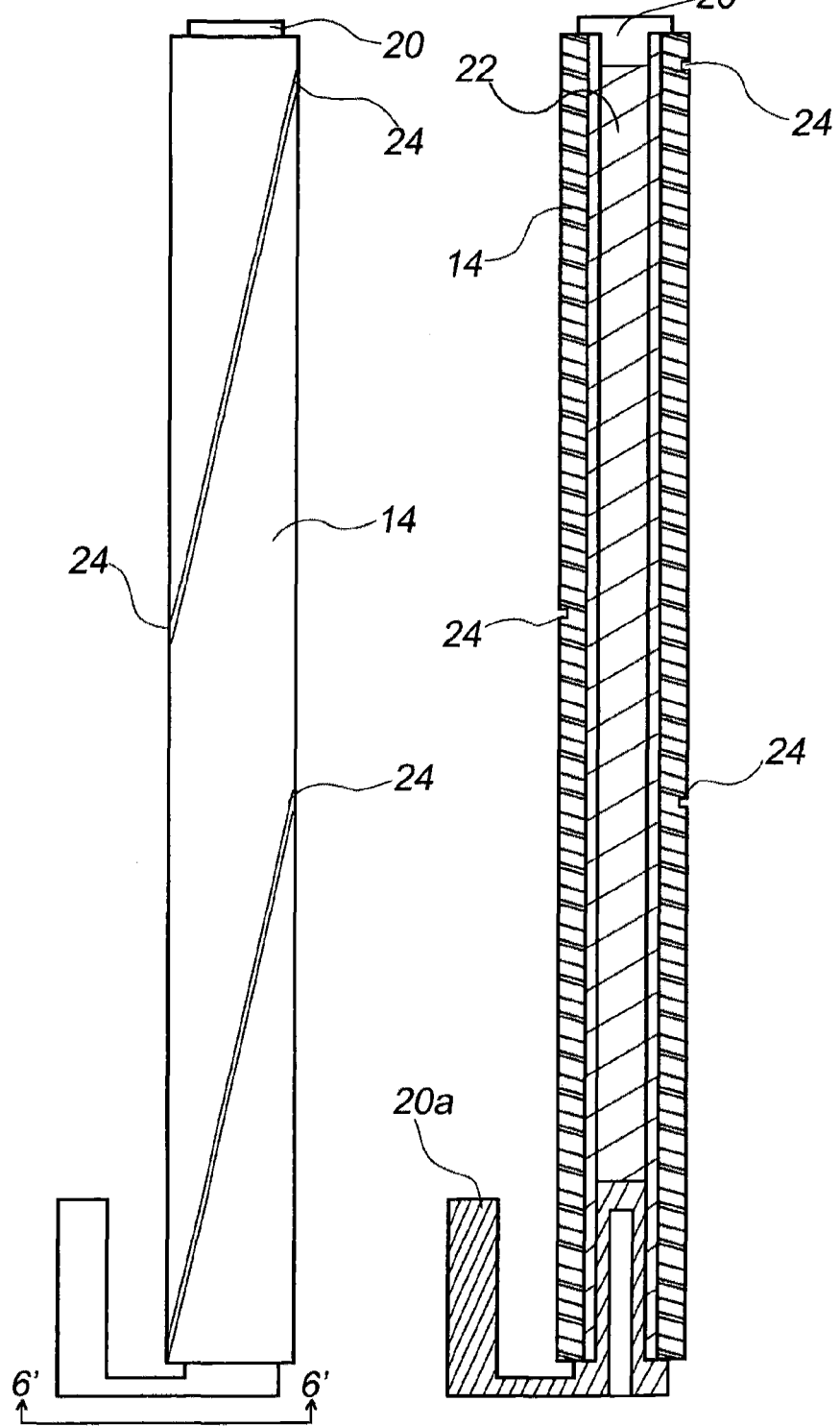

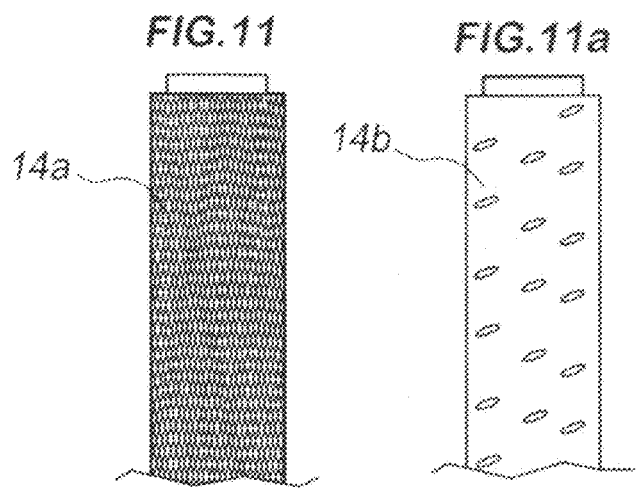
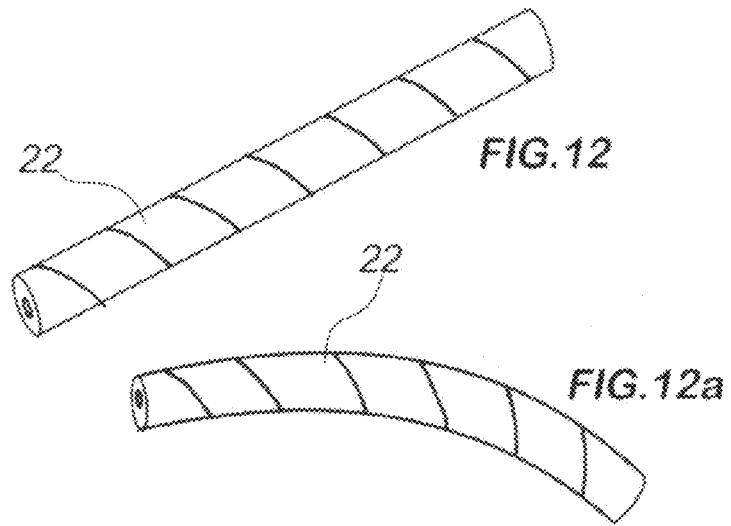

WINDSHIELD ROLLER

CROSS REFERENCE TO RELATED APPLICATIONS

This application claims the benefit of Provisional Patent Application No. 61/202,804 filed Apr. 8, 2009

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

The present invention relates broadly to devices for cleaning windshields of rain and debris.

Although the wiping path varies by the make and model of vehicle, wiper blade assemblies are relatively consistent in construction, typically including an (a) elongated rubber element in the form of a scraper having a triangular cross section, (b) a metal strip called a flexor affixed along the backbone of the element, (c) a pair of claws designed to grasp the flexor, (d) a "superstructure" to which the claws are pivotably attached, and (e) an attachment point in the middle of the superstructure for affixing the entire wiper assembly to the wiper arm which is connected to a wiper motor. Presently all wiper blades attach to the middle of the superstructure. Although the so-called "Shepherd's Hook" type attachment is currently the industry standard, a number of alternatives are available and well known in the art.

Conventional windshield wiper blades suffer from checking and fault lines due to the motion imparted by the wiper arm and the constant flexing of the wiper blade material which tends to stress and eventually tear the wiper blade; usually away from the flexor. It is not uncommon to encounter a wiper blade torn longitudinally and flopping about during use. Both cold and heat may accelerate the degradation of the wiper blade; the cold rendering the material brittle and subject to cracking, and the heat speeding the decomposition of the polymer.

Of even greater concern than wiper degradation, is that the geometry of the wiper blade causes the wiper to scrape across the window, where grit and other abrasive debris may become trapped between the wiper blade and the windshield glass; resulting in scoring.

Some improvements to wiper blade geometry have been attempted; usually in the form of multiple blades in order to improve water removal. However, the multiple blade configuration simply exacerbates the issue of moving abrasive grit about the windshield surface. Regardless the coefficient of friction of the wiper material, because of the inherent geometry which is essentially that of a squeegee, grit and other debris eventually become trapped between the blade and the windshield glass.

Another concern with wiper blades is that even while the backbone allows for flexing of the blade to generally follow the contour of the windshield, windshield glass has many irregularities such as pocks and valleys that together shield debris from the blade edge.

What is needed is a wiper assembly that may be retrofitted onto existing wiper arms, and having a windshield surface contacting portion that rolls across the surface conforming to any surface irregularities, and so permitting the wiper assembly to remove grit and debris without scoring the glass.

SUMMARY OF THE INVENTION

The present invention is a windshield roller assembly that may be retrofitted to existing wiper arms to provide a rolling surface instead of the common scraping wiper blade. Several advantages are obtained with the relatively soft rolling surface including; conforming to the surface irregularities of windshield glass, expelling grit, water and other debris from low spots and around high spots, and bypassing the scraping action which tends to score windshield glass over time. Because rollers are not subjected to the kinds of stress incurred by wiper blades, it is expected that the service life of a roller will greatly exceed that of a wiper blade. It is also expected that lighter pressures and superior surface clearing are possible with the roller assembly than with conventional wiper blade assemblies.

The windshield roller may be a simple cylindrical shape of extruded soft polymer having a longitudinal core of a semi-rigid material such as a carbon fiber rod, a plastic tube spirally cut, or a metal spring to permit flexing under pressure. Although the windshield roller may be retrofitted to a conventional wiper arm, as manufacturers respond to the advantages of the device, changes may be made to the wiper arm to produce a wiping geometry that leverages the unique properties of a rolling surface. It is envisioned that the so-called "claws" of the conventional wiper blade assembly may be obviated by attaching the ends of the roller by way of a bracket, directly to the ends of the superstructure. Because the path of the wiper arms is radial, the diameters of the ends of the wiper blade will necessarily vary, producing a subtle elongated frusto-conical shape.

One object of the present invention is to provide a rolling surface for the removal of water and debris from a windshield without scoring.

Another object of the present invention is to provide a soft rubberized roller that will flex to fill the irregularities of a windshield surface in order to more effectively remove water and debris.

Another object of the present invention is to allow for multiple rollers on one wiper arm with at least one of the rollers having a siped surface.

Another object of the present invention is to utilize extruded flexible materials in the construction of the roller that would exceed the life expectancy of conventional blades.

Another object of the present invention is to provide a roller that may be filled with an anti-freeze liquid for additional advantage in northern latitudes where ice and snow are common.

Another object of the present invention is to provide a roller that will permit the use of a heating element to further aid any applications with anti-freeze.

Yet another object of the present invention is to provide a roller that may be colored to match the color of a vehicle.

Still another object of the present invention is to provide a roller in various lengths and diameters depending on the application.

Still another object of the present invention is to provide for multiple rollers to be mounted in offset fashion on the wiper arm so as to eliminate streaking.

While examples discussed herein are directed generally to a roller assembly for the removal of water and debris from a windshield, the description that follows is not intended to limit the scope of the invention to the particular forms set forth, but on the contrary, it is intended to cover such alternatives, modifications, combinations and equivalents as may be included within the spirit and scope of the invention as set forth in the detailed description. It should also be understood that proportions depicted in the drawings are used for conciseness and clarity only and should not be construed as limiting.

BRIEF DESCRIPTION OF THE DRAWINGS

FIG. 5 is a plan of a preferred embodiment according to the present invention;

FIG. 6 is a sectional view the embodiment of FIG. 4 taken along lines 4'-4';

FIG. 7 is a plan of a another embodiment according to the present invention;

FIG. 8 is a sectional view the embodiment of FIG. 6 taken along lines 5'-5';

FIG. 9 is a plan of a another embodiment according to the present invention;

FIG. 10 is a sectional view the embodiment of FIG. 9 taken along lines 6'-6';

FIG. 11 depicts surface siping 14a of the roller assembly;

FIG. 11a depicts surface perforation 14b of the roller assembly;

FIG. 12 depicts an unbowed resilient stiffener 22;

FIG. 12 depicts an bowed resilient stiffener 22.

DETAILED DESCRIPTION OF THE INVENTION

Figure 1:
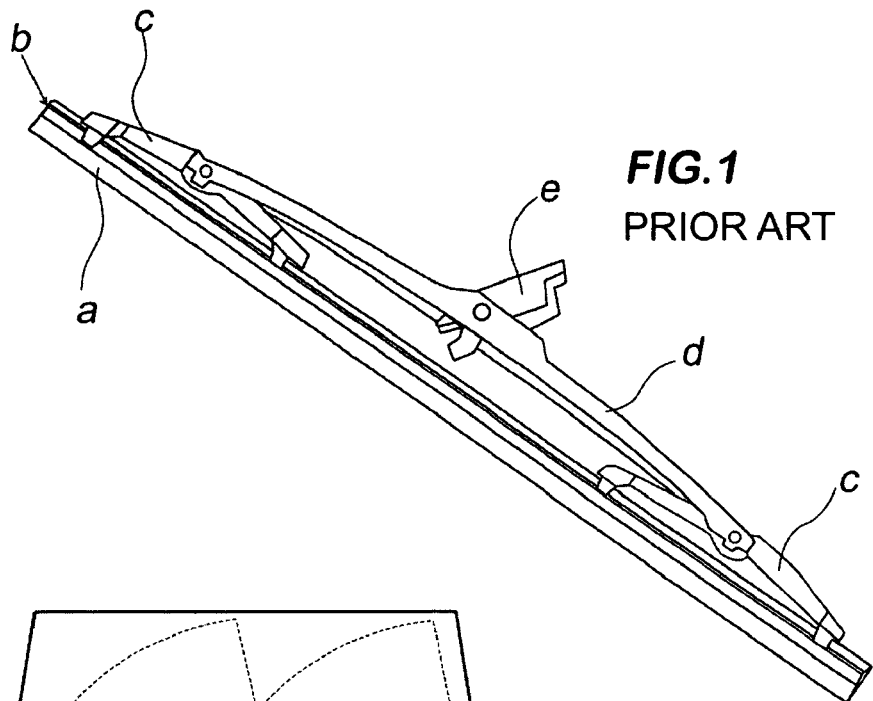
FIG. 1 is a perspective view of a prior art wiper blade assembly.

Element Listing for the Prior Art Wiper Blade Assembly Depicted in FIG. 1:
a rubber element (blade)
b flexor
c claws
d super
e attachment point for wiper arm
Reference Listing for Windshield Roller Assembly:
10' roller assembly
12 roller frame
14 roller element/roller
14a siped roller element
14b perforated roller element
16 roller element brackets
18 wiper arm/mounting arm
20 end cap bearing assembly
20a end cap with insert
22 internal stiffener
24 water channels The term "siping" or "sipe" referred to herein is process of cutting thin slits across a rubber surface to improve traction in wet or icy conditions.

FIG. 1 depicts a conventional wiper blade assembly for comparison purposes.

Figure 2A:
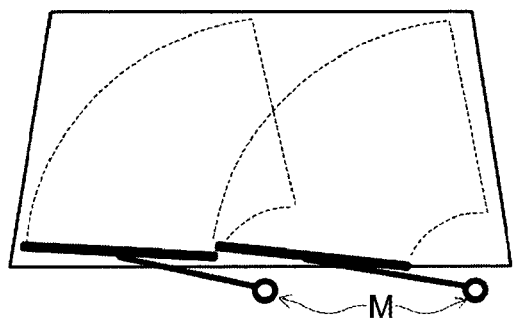
FIGS. 2a, 2b and 2c depict three common wiper path geometries.
Figure 2B:
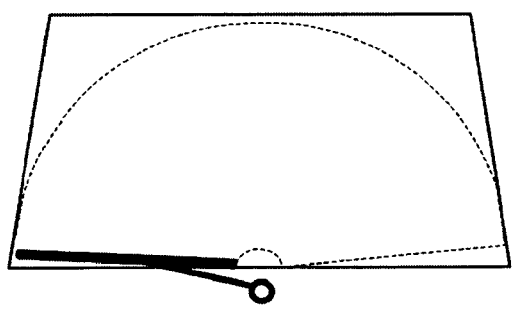
Figure 2C:
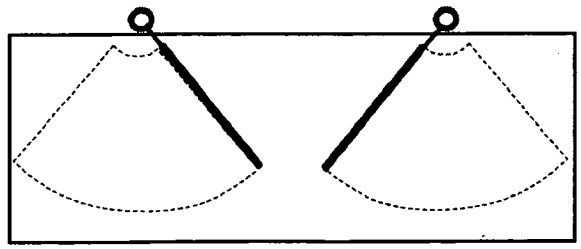

FIGS. 2A, 2b and 2c depict common wiper blade path geometries. FIGS. 2a and 2b specifically depict a wiper blade assembly attached to a wiper arm in the middle of the superstructure. FIG. 2c depicts wiper blade assemblies that are attached to the wiper arm toward one end of each wiper assembly. The wiper arms are connected to a wiper motor M.

Referring generally to FIGS. 3-12a, a preferred embodiment according to the present invention is depicted, including a frame 12 that is substantially like the conventional superstructure of a wiper blade assembly, a pair of retention brackets 16 and the rolling element 14. The roller element 14 possesses a soft exterior composed of rubber or synthetic rubber and is typically tubular, having a resilient stiffener 22 within. The stiffener, while preferably a spiral cut plastic tube to allow for flexing, may also be a steel spring, carbon fiber rod, or a relatively rigid rubber insert. The salient point is that the roller be permitted to bow during travel while still rotating. The roller assembly may be retrofitted to any conventional wiper assembly by using retention brackets 16 that typically would be adapted for use with various wiper assemblies. The brackets 16 include a shaft that is inserted into the end cap bearing assemblies and are held therein by tension, the brackets being firmly affixed to the frame 12. It is envisioned that the brackets would affix to the wiper blade superstructure by means of a releasable friction fit or snap fit, the internal molding of the brackets 16 generally conforming to the outer shape of the distal portions of the wiper superstructure.

As would be appreciated by one in the art, the surface of the roller element may be grooved 24 or siped 14a to create a tactile surface that captures and slings water and debris away from the windshield surface. It is also conceivable that perforations 14b within the roller element may act to channel water.

The roller assembly 10' may be affixed to a any current wiper arm by using brackets 16 which are sized to fit standardized wiper arms. In the cases where a truncated wiper arm is used, as depicted in FIG. 2c, the roller element 14 alone may be affixed directly to the wiper arm 18.

It is possible to affix at least two roller elements to a single wiper arm with the use of an offset end cap with shaft 20a as shown in FIG. 10. Multiple roller elements may be mounted in this way to a single wiper arm by adding additional shafts to the end cap 20a.

In the sectional view depicted in FIGS. 6, 8 and 10, the stiffener 22 is a spiral cut plastic tube that is able to flex and rotate at the same time which is a particular characteristic of springs.

Figure 3:
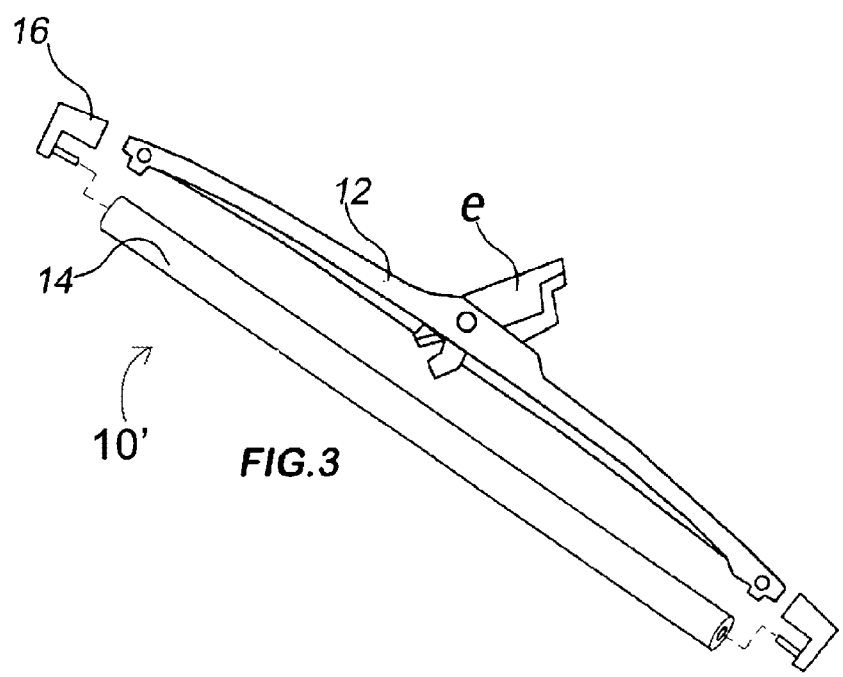
FIG. 3 is a partially exploded view of a preferred embodiment according to the present invention depicting a windshield roller assembly.
Figure 4:
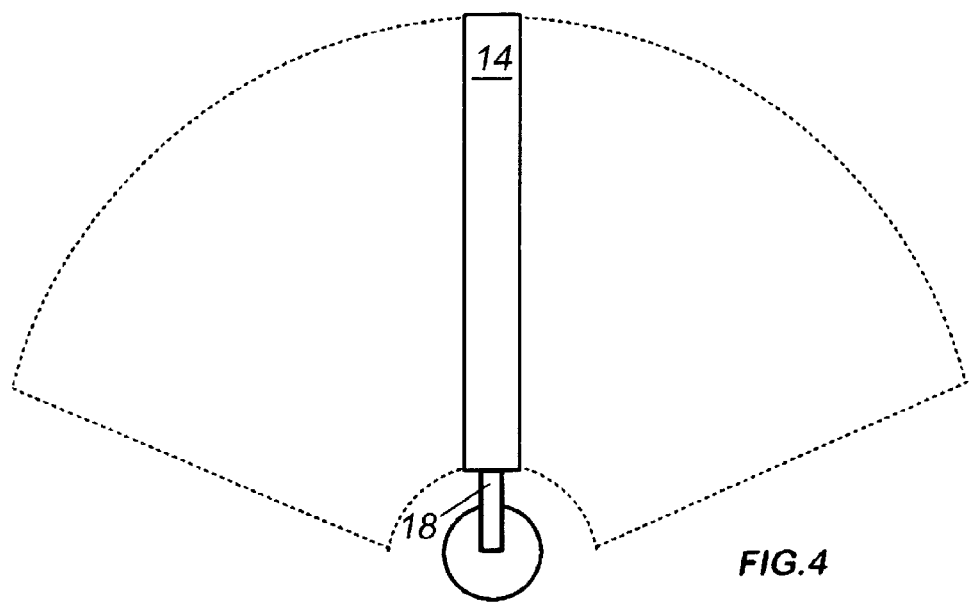
FIG. 4 is a plan view of another embodiment according to the present invention, mounted on a truncated wiper arm 18.

The relative rigidity of the stiffener permits an even pressure to be applied across the surface of the roller element whether the element is connected to the assembly as shown in FIG. 3 or as depicted in FIG. 4.

While not shown, it is envisioned that the end caps with respect to the brackets with shafts 16 may form a ball and socket combination, if the end caps have molded therein a spherical cavity to accommodate a spherical portion on the ends of the shafts.

While the invention has been described by the embodiments given, it is not intended to limit the scope of the invention to the particular form set forth, but on the contrary, it is intended to cover such alternatives, modifications, and equivalents as may be included within the spirit and scope of the invention as defined by the appended claims.

I claim:

1. A roller system for clearing a windshield of water and debris comprising:
    (1) at least one mounting arm connected to an electric motor at one end thereof for oscillating movement over the windshield,
    (2) at least one rolling element having two opposing ends,
    (3) at least one retainer for securing the roller element to the mounting arm,
    (4) at least one end cap for bearing purposes within at least one of the opposing ends, and,
    (5) a spiraled stiffener inside the roller element.

2. The roller system of claim 1, in which the rolling element material is composed of natural or synthetic rubber.

3. The roller system of claim 1, in which a surface of the rolling element is siped.

4. The roller system of claim 1, in which the rolling element is shaped and sized to travel in an arc.

* * * * *